Feb. 4, 1969     D. J. DICKSON     3,425,704
COLLET CHUCKS
Filed Jan. 5, 1965
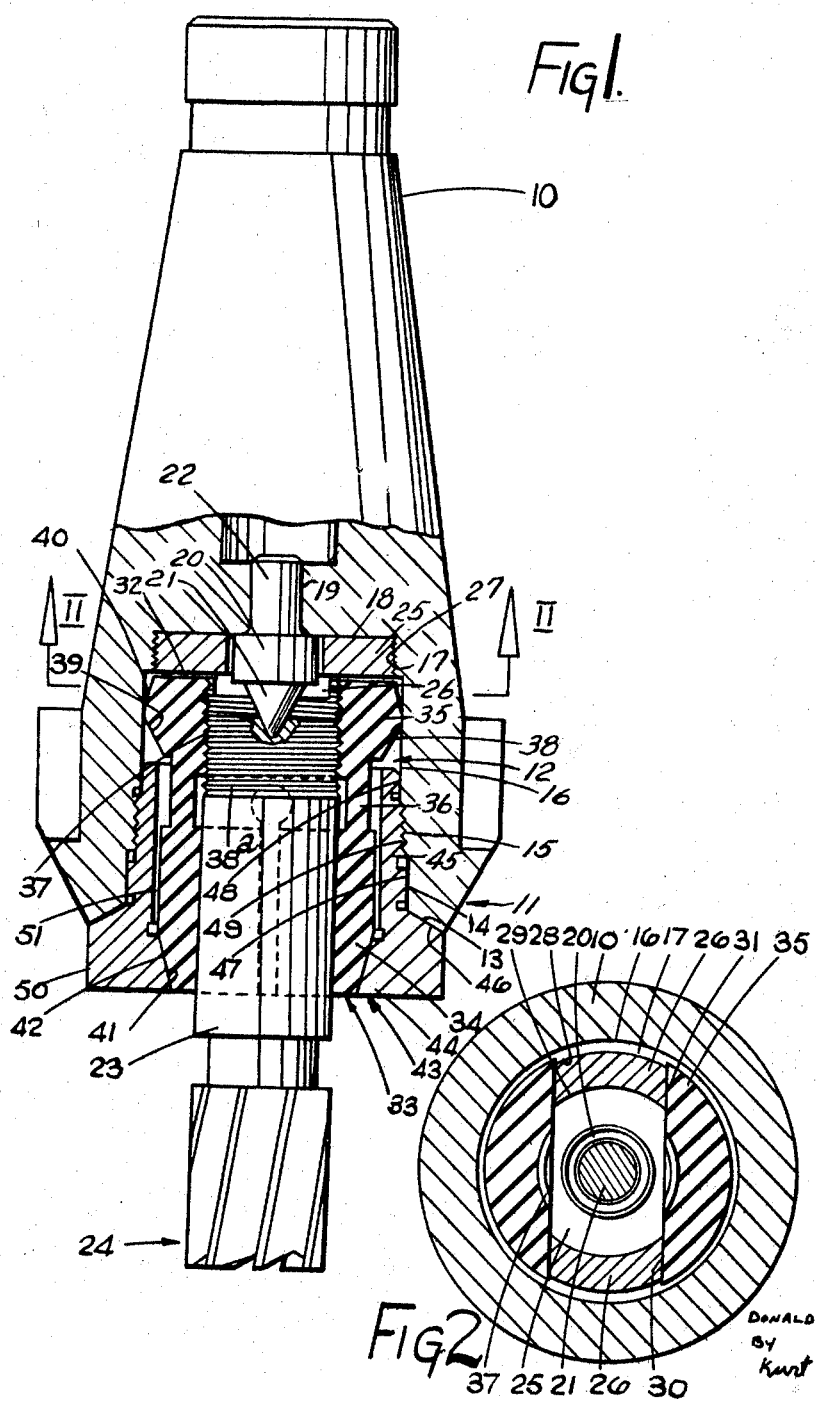
INVENTOR.
DONALD JOHN DICKSON
BY
Kurt Kelman
agent 3,425,704
COLLET CHUCKS
Donald John Dickson, Albury, Surrey, England, assignor to Qualcut Tools Limited, Sheffield, England, a British company
Filed Jan. 5, 1965, Ser. No. 423,530
Claims priority, application Great Britain, Jan. 10, 1964, 1,293/64
U.S. Cl. 279—51                                                                     1 Claim
Int. Cl. B23b 31/12

ABSTRACT OF THE DISCLOSURE

A collet chuck having a sleeve radially interposed between a sidewall of an axial recess in the chuck body and the chuck collet, the collet being tightened by engagement of its conical outer end with a conical surface of the sleeve when the latter is moved threadedly in the recess, the sleeve having two axially spaced cylindrical external bearing surfaces which engage corresponding internal surface of the chuck body coaxially to center the sleeve, while a cylindrical guide surface on the axially inner end of the collet is centered by engagement with a corresponding cylindrical surface of the chuck body.

---

This invention relates to self tightening collet chucks comprising a body formed with an axially extending recess at its forward end, a collet disposed within said recess having a plurality of radially displaceable jaws adapted to grip a tool shank and an internal screw-thread adapted to engage a corresponding thread on said shank, and a sleeve held in the body and affording a frusto-conical surface adapted to co-operate with a corresponding or complementary surface on the collet jaws to displace same radially inwardly into a gripping relationship with said shank. The arrangement is such that any turning of the tool relatively to the chuck body under the influence of a work load causes axial movement of the collet and consequent closing of the collet jaws onto the shank due to the interaction of said conical surfaces with the result that the grip on the tool is increased. The type of chuck described above is hereinafter referred to as a chuck of the kind specified.

Accurate centering of the tool in the chuck is of particular importance so that the operation performed by the tool is as accurate as possible. Any misalignment between the body of the chuck and the tool can also cause high stresses to be set up in the tool with a risk of fracture or at least undesirable wear. This is of especial importance when the chuck is one of an assembly forming part of an automated machine which latter performs a large number of different operations on a workpiece. In such circumstances any faulty operation of a single tool due to misalignment or wear may lead to rejection of a relatively costly item of manufacture which has been subject to a large number of operations. For these reasons it is of the highest importance that the tool should be as accurately centered in the chuck as is possible. Moreover the cost of producing a chuck having the requisite accuracy of centering must not be so excessive as to render its use impracticable.

The object of the present invention is to provide a chuck of the kind specified capable of aligning a tool held thereby more accurately than hereto has been possible whilst meeting the above requirements.

According to the present invention a chuck of the kind specified is characterised in that the inner surface of the recess in the forward end of the body is formed with two axially spaced accurately machined sleeve locating surfaces each providing a radial location for said sleeve so that this is maintained accurately in coaxial relation with the axis of rotation of said body, and in that said sleeve has externally formed thereon two corresponding axially spaced bearing surfaces adapted to co-operate with said sleeve locating surfaces to centre said sleeve on said axis, the end of the collet remote from the jaws thereof having formed thereon an external cylindrical guide surface adapted to co-operate with a corresponding collet locating surface which is accurately disposed relatively to said axis to locate said end of the collet.

In order to facilitate axial movement of said sleeve within said recess co-operating screw threads may be formed on the inner surface of said recess between said sleeve locating surfaces and on said sleeve between said two bearing surfaces respectively, whilst to facilitate radial movement of the collet jaws, the collet may be so formed as to provide a radial clearance between the collet and said sleeve over that part of the length of the collet which extends between the frusto-conical surface and the cylindrical guide surface thereon.

Preferably both of said sleeve locating surfaces in the recess are of cylindrical form. The collet locating surface may be formed as an axial extension of the inner of the axially spaced locating surfaces in the recess.

The collet may be formed with a straight sided channel extending diametrally across its inner end face and the collet may be driven from the chuck body by means of lugs projecting into each end of said channel, such lugs being fixed rotationally relative to the body. The width of the straight sided channel may be approximately half the diameter of the end face of the collet. Alternatively two mutually perpendicular straight sided channels may be formed in the end face of the collet, each having a width of approximately one-quarter the diameter of the end face thereof, and there may be one lug projecting into each end of each channel. Preferably such lugs are formed as projections from a driving ring inserted into an additional recess in the end face of the recess in the body.

The invention will now be described by way of example with reference to a preferred embodiment as shown in the accompanying drawings wherein:

FIGURE 1 shows a chuck partly in diametral cross-section, and

FIGURE 2 shows a transverse cross-section on line II—II of FIGURE 1.

As seen in FIGURE 1 the chuck comprises a body 10 which may have an external taper conforming either to "Morse" or "International" standards. At its forward end 11 the body is formed with a central recess 12. The radial surface of this recess includes a shallow frusto-conical surface 13 at its forward or outer end, and an accurately cylindrical outer locating surface 14 which is accurately coaxial with the axis of rotation of the chuck. Internally of the outer locating surface is a screw threaded portion 15 of slightly smaller diameter, and an inner locating surface 16 which extends for approximately half the depth of the recess and is also accurately cylindrical and coaxial with the axis of rotation of the body and of slightly smaller diameter than the outer locating surface. The innermost axial surface 17 of the recess is of lesser diameter than the inner locating surface 16 and is screw threaded. The inner end wall 18 of the recess lies in a plane perpendicular to said axis of rotation and has an arrow bore 19 concentric with said axis extending therefrom.

The recess 12 is preferably made by first drilling a somewhat undersize bore. It will be appreciated that the axis of this bore should be substantially coaxial with said axis of rotation but need not be so accurately located with respect thereto as is required in the case of the locating surfaces 14 and 16. A narrow land can then be ground accurately concentric with said axis of rotation at the inner end of the initial bore. Since the axial length of this land is quite small, typically 0.050 inch, it can be accurately and uniformly machined. This land then affords a datum surface for the grinding of the two axially spaced locating surfaces 14 and 16, and may in fact comprise part of the inner locating surface 16.

A centre member 20 formed with a conical projection 21 on the front face thereof is mounted centrally on the end wall 18 by means of an integral stem 22 which projects from the rear face of the centre member and fits accurately into the narrow bore 19. The apex of the conical projection 21 forms a stop for the inward movement of the end face of the shank 23 of a tool 24 held in the chuck. The end of the tool may be plain or may be formed with a corresponding conical recess, but in either case the conical projection need not serve to locate the tool accurately radially. Preferably however, the centre member is accurately located on said axis of rotation and the tool shank has an accurately centred corresponding conical recess as shown. It is to be understood however, that the improved accuracy of alignment which this chuck affords does not depend on this feature as will be explained hereinafter.

A driving member 25 of annular form and rectangular cross-section having a screw-threaded outer periphery 27 is screwed into the inner end of the recess with the centre member 20 projecting centrally through the ring. This driving member is formed with two dogs 26 projecting from its forward surface. These dogs, as can best be seen in FIGURE 2, are of part annular form having their outer and inner curved sides 28 and 29 respectively concentric with said axis of rotation and their ends 30 parallel to a radius drawn from said axis to the longitudinal centre of the dog. It would be possible for the driving engagement between the body and the collet to be afforded by complementary formations (for example corresponding projections and recesses) in the end face 18 and the end face 32 of the collet, but a separate driving ring as described is preferred.

The dogs 26 are diametrally opposed to one another and fit into a straight sided recess 31 in the inner end face 32 of the collet 33. The width of this recess 31 is approximately half the diameter of the end face 32. Alternatively a driving ring with four projecting dogs could be used in which case the end face of the collet can be formed with two mutually perpendicular straight sided recesses each having a width of approximately one-quarter of the diameter.

The collet 33 comprises a head portion 35 and a plurality of jaws 34 formed integrally therewith, typically three in number and each adapted to grip the shank 23 of the tool 24. Each such jaw 34 is connected to the head portion 35 by means of a connecting portion 36 which is of lesser thickness than the jaw itself and thus affords a degree of resilience permitting radial movement of the jaw.

While the collet is of a generally conventional type it has the following important features in addition to the provision of the straight sided recess in its end face. The head portion 35 is formed with a central screw threaded bore 37 into which the screw threaded end 38a of the tool shank 23 is screwed. The peripheral portion of the head 35 is provided with an accurately machined cylindrical guide surface 38 which co-operates with the inner locating surface 16 to align the head portion of the collet accurately on said axis of rotation. The remaining peripheral surfaces 39 and 40 respectively forward and rearward of the surface 38 taper towards the centre line of the chuck. However, these latter surfaces could be substantially parallel to said axis with the cylindrical guide surface 38 provided on an annular flange. A further significant feature of the collet is that it is accurately centred at its forward end by virtue of accurately machined forwardly tapering part frusto-conical faces 41 on each jaw 34. These faces 41 co-operate with a complementary accurately centred frusto-conical face 42 formed at the forward end of a sleeve 43 which surrounds the forward end of the collet. The angle of taper of these surfaces is small and preferably approximately 15°.

This sleeve 43 comprises a head portion 44 which has formed therein the frusto-conical face 42 and an inwardly projecting tubular portion 45. The internal diameter of the tubular portion is slightly larger than the external diameter of the collet jaws so that the internal surface 51 of the tubular portion 45 is clear of the outer surface of such jaws. The rear face 46 of the head portion 44 may be tapered in conformity with the taper of the outermost surface 13 of the recess 12 or alternatively both these surfaces may be perpendicular to said axis of rotation. In either case the surfaces 13 and 46 come into abutment to limit the inward movement permitted to the sleeve 43 when the latter is nominally tightened to fix a tool in the chuck as hereinafter described. The tubular portion 45 of the sleeve 43 is formed externally with two accurately machined bearing surfaces 47 and 48 which co-operate with the corresponding locating surfaces 14 and 16 respectively to ensure that the sleeve 43 is accurately aligned on said axis of rotation. Between the surfaces 47 and 48 there is formed a screw threaded portion 49 which co-operates with the screw threaded portion 15 of the radial surface of the recess 12 so that the position of the sleeve may be axially adjusted by relative rotation of the sleeve and the body. For this purpose the periphery 50 of the head portion 44 of the sleeve may be of hexagonal or other polygonal form so that the sleeve may be rotated with the aid of a spanner or like device. Alternatively the head could be of generally circular shape with its periphery 50 milled or otherwise roughened to enable it to be easily gripped either by hand or a tool such as a wrench.

When it is required to insert the shank of the tool the sleeve 43 is screwed outwardly until the jaws 34 of the collet are fully open so that the shank 23 passes easily between them. The screw threaded end 38a of the shank is then screwed into the bore 37 in the head of the collet until the end face of the shank comes into contact with the conical projection 21 of the centre member 20. The sleeve is then screwed into the body until the rear face 46 of the head 44 abuts the corresponding face 13 on the body. It will be understood that the sleeve need not be screwed excessively tightly into place, but only sufficiently firmly for the jaws 34 of the collet 33 to be deflected inwardly to an extent sufficient to grip the shank of the tool firmly due to the interengagement and relative axial movement of the conical surfaces 41 and 42. The fit between the screw threads 15 and 49 is sufficiently slack for there to be a limited amount of radial movement between these threads so that the centring of the sleeve 43 is determined entirely by the locating surfaces 14 and 16 contacting the corresponding bearing surfaces 47 and 48 respectively. Thus the sleeve positively resists both angular and lateral displacement of its axis from said axis of rotation due to the fact that there are two axially spaced locating surfaces provided. Thus the conical surface 42 in the head portion 44 of the sleeve is also accurately located and positively restrained against such displacement. The restraint imposed on the sleeve by these surfaces is analogous with that achieved by a beam which is supported rigidly at both ends, whereas in previously known constructions wherein a sleeve is located by a single locating surface at the forward end of a screw thread in a bore in the body the conditions are analogous rather to a beam supported rigidly at one as a cantilever.

Since the conical surface 42 engages the corresponding part conical surface 41 on the collet jaws the forward end of the collet is also accurately located. The rear end or head portion 35 of the collet is also accurately centred by contact between the cylindrical guide surface 38 thereon and the innermost part of the locating surface 16. It is this contact which serves to locate the inner end of the collet accurately rather than the conical projection 21 which may engage in a corresponding recess in the end face of the tool shank. This is one of the features which contributes to the increase in accuracy of alignment which is achieved since the contact area between the surfaces 38 and 16, at which the body and collet head are stressed by forces tending to displace the collet, is appreciably larger than the corresponding contact area available on the conical projection which in previously known constructions has been used to locate the inner end of the tool shank. Thus even if the conical projection should not assist in the location of the collet or the tool there will still be less elastic deformation of the metal forming the contacting surfaces due to the correspondingly smaller pressure applied thereto as a result of the greater surface area. If the conical projection does assist in the location then a slight further improvement is achieved since the contacting area which is stressed is slightly increased by the addition of the contact area between the conical projection and the corresponding recess in the tool shank. This results in a further slight decrease in the pressure applied to the surfaces and hence the deformation is also slightly further reduced. It will be apparent however, that the major factor in achieving the accuracy of location of the inner end of the collet is the use of the peripheral face on the collet head as the locating surface rather than a much smaller face in the end of the tool shank as has been used previously. Thus the collet is also accurately centered at both ends and is positively restrained against both angular and lateral displacement of its longitudinal axis relative to said axis of rotation by virtue of the guide surface 38 and bearing surface 42 which are spaced apart axially.

When the tool is in use any tendency of the shank 23 to rotate relatively to the collet 33 due to the working load applied to the tool results in a slight axial movement of the collet due to the engagement of the screw threads 38a on the shank and the threads 37 on the collet. These threads are so arranged with respect to the direction of rotation of the shank that the relative rotation caused by resistance to turning of the tool causes the collet to move axially outwards. In this way the collet jaws 34 are urged into tighter contact with the shank of the tool due to the engagement of the conical faces 41 and 42. It will be appreciated that at no time during the operation of the tool will there be any relative rotation between the body 10, the driving ring 25, the collet 33, and the sleeve 43 since the drive applied to the collet is positive due to the dogs 26 being in abutment with the sides of the recess 31 in the collet head 35. Thus the body 10 and collet 33 are effectively rigid as regards rotation. Since this is so, no rotational force will be exerted on the sleeve 43 and although the grip of the collet jaws on the tool shank will rapidly tighten as the tool is used there will be no tendency for the sleeve to be screwed further into the recess 12. Thus the sleeve can readily be unscrewed when it is required to remove the tool, and the force required to do so is no greater than that which was used to screw the sleeve in the first instance.

Whilst a known chuck of similar type may typically have an accuracy of centering no better than 0.004 inch, and at best approximately 0.001 inch, it has been found that by employing two axially spaced radial locating surfaces to centre the sleeve and two further such surfaces to centre the collet an accuracy of centering of 0.0004 inch can readily be obtained. The diameters of the locating surfaces need be machined only to a tolerance of 0.0001 inch total indicator reading for concentricity. This is no more stringent than the accuracy needed in conventional constructions to achieve centering accuracy in the range 0.001–0.004 inch when a single longer locating surface is used. Thus whilst the locating surfaces need only be machined to a previously usual standard readily achieved by known methods of machining the resulting accuracy of centering shows a considerably improvement over that previously attained.

Although the locating surface 16 has been described as extending axially for approximately half the depth of the recess 12 it will be appreciated that this surface may only be accurately machined over those parts of its length which are required to be in contact with the bearing surfaces 38 and 48 over their operative range of axial movement. Similarly although a common locating surface 16 has been described for co-operating with both surfaces 38 and 48, separate axially spaced locating surfaces of differing radius could be employed.

What I claim then is:

1. In a self-tightening collet chuck including a body (10) having an axis of revolution and a recess (12) coaxial therewith, said recess having a side wall extending axially from one end (11) of said body internally thereof and a rear wall (18) extending transversely of said axis; a sleeve (43) threadedly movable in said recess and including an internal surface having a frusto-conical portion (42) and a cylindrical portion (51); a collet (33) in said sleeve, said collet having a plurality of radially displaceable jaws (34) formed with external surfaces (41) collectively of substantially frusto-conical form for engagement with said frusto-conical portion (42) of said internal surface of the sleeve (43) to displace said jaws radially inwardly in response to relative axial movement between said sleeve and said collet; and means for centering said sleeve and said collet coaxially with said axis; the improvement in the centering means which comprises:
    (a) two axially spaced bearing surfaces (47, 48) disposed externally on said sleeve (43);
    (b) two corresponding sleeve locating surfaces (14, 16) incorporated in said side wall of said recess (12) and respectively engaging said bearing surfaces (47, 48);
    (c) a cylindrical guide surface (38) on said collet (33) at a position spaced axially inwardly of said recess (12) from said frusto-conical surface (41) presented by said jaws (34); and
    (d) a cylindrical collet locating surface (16) incorporated in said side wall of said recess (12) axially inwardly of said sleeve locating surfaces (14, 16) and engaging said guide surface (38).

References Cited

UNITED STATES PATENTS

| | | | |
|---|---|---|---|
| 2,367,998 | 1/1945 | Clarkson | 279—53 |
| 3,028,168 | 4/1962 | Hughes | 279—52 X |
| 3,120,961 | 2/1964 | Clarkson | 279—53 X |

FOREIGN PATENTS

| | | |
|---|---|---|
| 1,252,592 | 12/1960 | France. |
| 1,304,260 | 8/1962 | France. |
| 770,207 | 3/1957 | Great Britain. |
| 827,169 | 2/1960 | Great Britain. |

ROBERT C. RIORDON, *Primary Examiner.*

U.S. Cl. X.R.

279—53